(No Model.)
J. E. DONOVAN.
Sewing Machine Treadle.
No. 230,251.  Patented July 20, 1880.
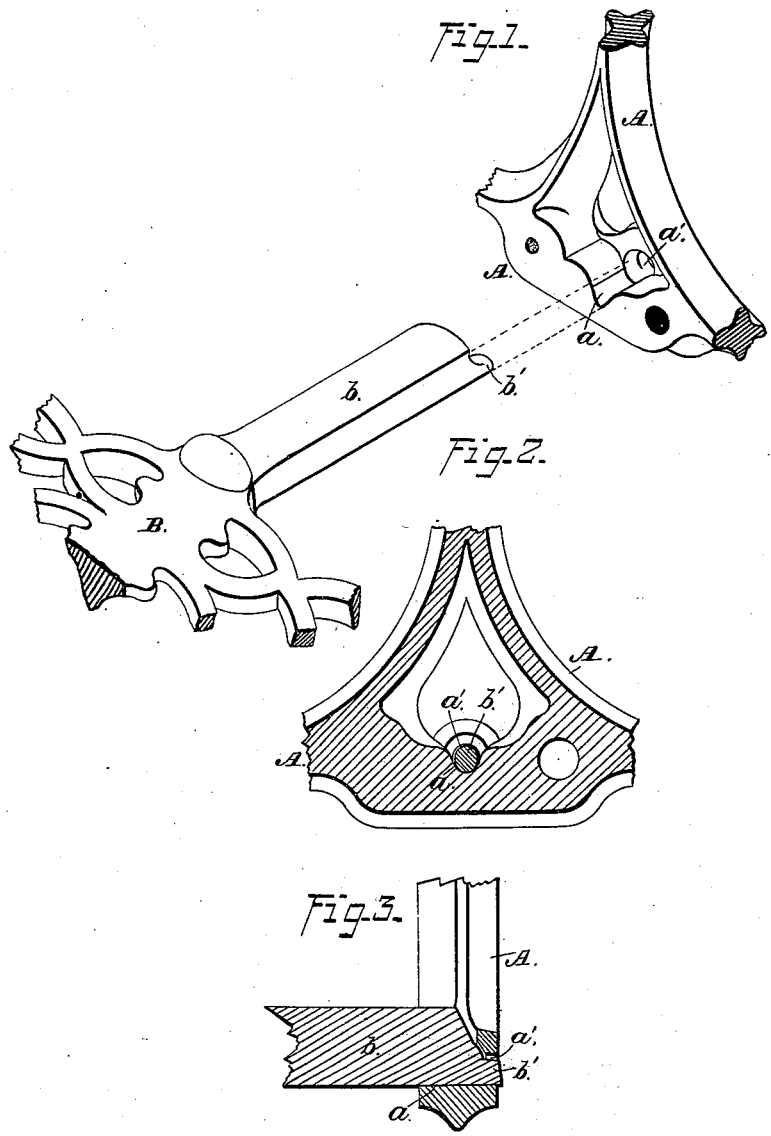
WITNESSES:
Jas. E. Hutchinson.
Henry C. Hazard.
INVENTOR.
John E. Donovan, by
Geo. S. Prindle, his Atty

UNITED STATES PATENT OFFICE.

JOHN E. DONOVAN, OF CINCINNATI, OHIO.

SEWING-MACHINE TREADLE.

SPECIFICATION forming part of Letters Patent No. 230,251, dated July 20, 1880.

Application filed June 9, 1880. (No model.)

*To all whom it may concern:*

Be it known that I, JOHN E. DONOVAN, of Cincinnati, in the county of Hamilton, and in the State of Ohio, have invented certain new and useful Improvements in Sewing-Machine Treadles; and I do hereby declare that the following is a full, clear, and exact description thereof, reference being had to the accompanying drawings, making a part of this specification, in which—

Figure 1 is a perspective view of one of the journals of my treadle and its bearings separated from each other. Fig. 2 is a vertical section of the same upon a line passing transversely through said journal and bearing, and Fig. 3 is a like view of said parts upon a line passing through the axis of said journal.

Letters of like name and kind refer to like parts in each of the figures.

The design of my invention is to reduce the friction of the bearings of a sewing-machine treadle and to insure the retention of the same within its bearings; to which end it consists in the construction and combination of the journals of the treadle and of their bearings, substantially as and for the purpose hereinafter specified.

In the annexed drawings, A represents the lower portion of one of the side frames of a sewing-machine table, provided within its lower end with a V-shaped groove or bearing, $a$, which extends from its inner face nearly to its outer face, and has its bottom considerably rounded. Extending from the outer end of said groove to the outer face of said frame A is a round opening, $a'$, which, in a full-size table, has a diameter of one-fourth of an inch, and has its lower side upon a line with the bottom of said groove.

The treadle B is provided at each end with an axial bar or journal, $b$, which has a V-shaped lower side, with the point rounded to enable it to fit loosely within the groove or bearing $a$. At the end of each journal $b$ is formed a pintle, $b'$, which has such size, shape, and relative location as to enable it to fit into the opening $a'$ when said journal rests within said bearing.

The entire weight of the treadle B is supported by or upon the journals $b$, and when said treadle is rocked or oscillated said journals have a rolling motion within their bearings which is practically frictionless and causes little or no wear of said parts.

The pintles $b$ operate to insure the positions of the treadle and to prevent its journals from becoming displaced by the lift of the pitman or in consequence of unusual side pressure. It is not intended that said pintles shall bear upon or within their openings except when said journals are moved from their bearings.

Having thus fully set forth the nature and merits of my invention, what I claim as new is—

The combination of the treadle-journal $b$, having a V-shaped lower side and provided with the round pintle $b$, with the V-shaped bearing $a$ and round opening $a'$, formed in the side frame, A, substantially as and for the purpose specified.

In testimony that I claim the foregoing I have hereunto set my hand this 29th day of May, 1880.

JOHN E. DONOVAN.

Witnesses:
L. M. HOSEA,
SAML. TATUM.